United States Patent [19]

McGinn

[11] Patent Number: 5,229,187

[45] Date of Patent: Jul. 20, 1993

[54] ROD CONSTRUCTION

[75] Inventor: John H. McGinn, Daisy Hill, Australia

[73] Assignee: McGinn Designer Rods Pty. Ltd., Queensland, Australia

[21] Appl. No.: 768,854

[22] PCT Filed: Apr. 5, 1990

[86] PCT No.: PCT/AU90/00129

§ 371 Date: Oct. 8, 1991

§ 102(e) Date: Oct. 8, 1991

[87] PCT Pub. No.: WO90/11683

PCT Pub. Date: Oct. 18, 1990

[30] Foreign Application Priority Data

Apr. 10, 1989 [AU] Australia .................. PJ3621

[51] Int. Cl.⁵ .................................. B32B 1/08
[52] U.S. Cl. .................................. 428/188; 428/364; 428/374; 43/18.1
[58] Field of Search .......... 43/18.1, 18.5; 428/397, 428/364, 373, 374, 375, 376, 188

[56] References Cited

U.S. PATENT DOCUMENTS

| | | | |
|---|---|---|---|
| 1,811,419 | 6/1931 | Anderson | 43/18.1 |
| 1,932,986 | 10/1933 | Powell. | |
| 2,364,849 | 12/1944 | Ibbotson et al. | 144/309 |
| 2,537,488 | 1/1951 | Stoner | 43/18 |
| 4,083,140 | 4/1978 | Van Auken et al. | 43/18.5 |
| 4,144,115 | 3/1979 | Sundberg | 428/373 X |
| 4,582,758 | 4/1986 | Bruce et al. | 428/397 |
| 4,759,147 | 7/1988 | Pirazzini | 43/18.5 |
| 5,077,113 | 12/1991 | Kakihara | 428/373 X |

FOREIGN PATENT DOCUMENTS

| | | |
|---|---|---|
| 139542 | 5/1985 | European Pat. Off. . |
| 2481575 | 11/1981 | France . |
| 143998 | 6/1920 | United Kingdom . |
| 287979 | 4/1928 | United Kingdom . |

Primary Examiner—Richard K. Seidel
Assistant Examiner—Kenneth J. Hansen
Attorney, Agent, or Firm—Foley & Lardner

[57] ABSTRACT

A rod comprises a plurality of elongate members joined together in an assembly, with each elongate member having a generally T-shape cross-section and being formed from fibre reinforced sheet material. Each member comprises two outwardly curved members formed with first leg sections contiguously disposed and connected to form the web of the T-shape, second leg sections extending at an angle to the first leg sections, and a planar cap member spanning and connected to the second leg sections to form the cap of the T-shape. The cap member has opposite ends which define abutment faces. Each curved member has a curved radius portion between the leg sections, with the curved radius portions and the planar cap defining a space therebetween which is filled with a filler material. The cap members are joined together so that said abutment faces of adjacent cap members are contiguous, thereby forming the assembly.

5 Claims, 3 Drawing Sheets 5,229,187

ROD CONSTRUCTION

FIELD OF THE INVENTION

This invention relates to rods and in particular to rods produced by a method which enables production of a rod with a desired set of characteristics when flexed.

BACKGROUND OF THE INVENTION

Flexible rods find applications in a variety of fields, for example, as fishing rods, which rods are tailored to suit particular applications. Stiffer rods are preferred for heavy fish, while very flexible rods are utilised in fly casting. A variety of materials and geometries are employed in these applications. In fishing rod construction, cylindrical section materials both hollow and solid have been used. Round materials pose problems in mounting thereon an aligned set of line guides. Some of the lightweight, flexible materials, such as hollow carbon tube, have poor crush characteristics and poor torsional performance so that the application of fishing line guides to them poses problems. The conventional technique involves binding a wire-form bracket firmly to the rod. Too much pressure can crush a carbon filament tube. Attempting to realign a guide by twisting it about the rod axis can result in a fracture. Other rods less prone to these problems suffer disadvantages in less desirable flexing characteristics. Construction of tube form rods with tapers is not easy.

U.S. Pat. No. 1,932,986 to Powell shows a split cane technique for rod assembly from a number of canes. A rod of this type is provided with a taper by reduction of the wedge section dimensions over the length of the elements of the assembly.

U.S. Pat. No. 4,582,758 to Bruce et al shows a development of the above utilising fibre resin reinforced plastic techniques. The cane wedge is duplicated in reinforced plastic and assembled in much the same way.

While a great variety of materials and layup techniques have been tried in the construction of rods, there is scope for improvements. It is desirable to establish a fabrication technique that may be applied to produce a range of rods each with preselected parameters for particular uses.

OBJECTS OF THE INVENTION

It is an object of the present invention to provide a rod fabrication technique that enables rods to be produced with predetermined properties utilising an assembly of preformed members.

Other objects, and various advantages of the invention will hereinafter become apparent.

OUTLINE OF THE INVENTION

The invention achieves its objects in providing a rod comprising
an assembly of elongate members each having abutment faces whereby each elongate member contacts its neighbor;
adjacent elongate members being joined together at their abutment faces;
characterised in that:
the elongate members have a generally T-shape cross-section with a flange capping a web section;
the assembly combines all the flanges together to establish a polygonal cross-section; and
the web sections of each elongate member being extended in a direction towards a common axis.

The invention also provides a rod comprising:
a plurality of elongate members;
the elongate members being arranged in an assembly about a central axis with at least one mating surface between adjoining elongate members; and
the elongate members being bonded at their mating surfaces with each elongate member being bonded to its two neighbors about the central axis;
characterised in that
each elongate member comprises a composite body formed with at least one reinforcing layer with fibres or filaments of reinforcing material extended therethrough in a predetermined pattern,
the predetermined pattern in planar form comprising a first array of said fibres or filaments extended parallel to the length of the elongate member, a second array of fibres or filaments arrayed across said first array and a third array, of fibres or filaments being arrayed oppositely to the second array, relative to the first array, to cut across the first and second arrays: and
the reinforcing layer being folded or curved about an axis which is parallel to the central axis and the axis of the first array.

BRIEF DESCRIPTION OF THE DRAWINGS

The invention will now be described with reference to preferred embodiments as shown in the accompanying drawings in which.

PREFERRED EMBODIMENTS

In construction of rods in accordance with the invention, advantage is taken of the properties of reinforced materials such as fibre reinforced plastics. In layup of the material, the orientation of the fibres or filaments is a concern and FIG. 1 illustrates a particular pattern which is useful.

Figure 1:
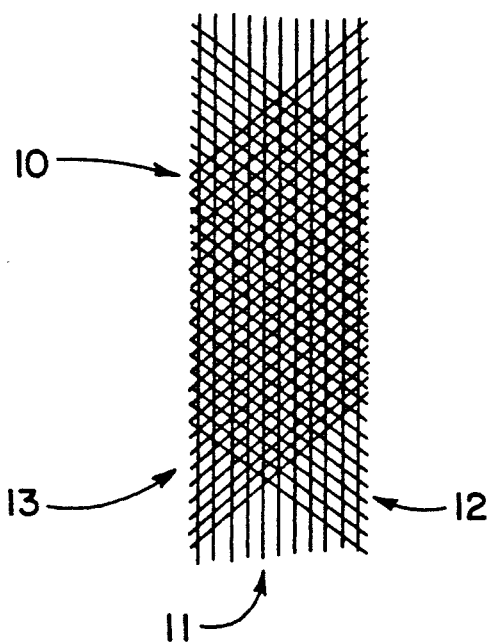
FIG. 1 illustrates an array of reinforcements utilised in the invention.

With reference to FIG. 1, a triaxial pattern is developed with longitudinally extended fibres or filaments 11 of the assembly 10 being those which in use will extend in a direction which is parallel to the elongate axis of the rod.

Extended across the arrays 11 are two further array of fibres or filaments, one to the left, array 12, the other to the right, array 13. Arrays 12 and 13 extend acutely to the direction of array 11 and to each other.

In production of the pattern of reinforcement of FIG. 1, the assembly 10 may be effected with layup of a cloth with a triaxial weave as shown or by overlap of three layers, each comprised of generally parallel fibres or filaments. In use of the latter, a layup may be established with a first layer of fibres oriented as in array 11 overlaid by second and third layers oriented each in one of the directions of arrays 12 and 13. Preferably the three layers are overlaid by a fourth array having the orientation of array 11, to create a sandwich of crossed fibres such as 12 and 13 between two parallel layers oriented along what will be the elongate axis of the rod. If desired, this pattern might be repeated with a succession of crossed layers sandwiched between layers oriented parallel to the elongate axis of the rod. Alternately, an array such as 12 might be sandwiched between two such as 11, with an array such as 13 superimposed and capped by another layer such as 11 to provide a five layer composite.

In production of the above, the aim is to include within the layup, a pattern of fibres or filaments which contains the elements of FIG. 1 and exhibits a degree of symmetry about the elongate axis.

In production of a rod as will be described below, layup of an assembly of fibres or filaments as in FIG. 1 is made with a geometry of the type indicated in FIG. 2 whereby an elongate member, the basic unit of a rod in accordance with the invention, is produced.

An elongate member 14 is produced with a curve about its elongate axis 15 which produces a U or generally V shape member with a base of chosen radius of curvature. The actual geometry of the elongate member 15 so far as its sectional view is concerned, is determined by the properties wanted in the completed rod. In layup of the elongate members, the pattern 10 of FIG. 1 exists in the member 14 with the array 11 of fibres or filaments extended along the members elongate axis 15. In this configuration, the fibres or filaments are curved or bent about the curve of the U or V shape of the member.

Figure 2:
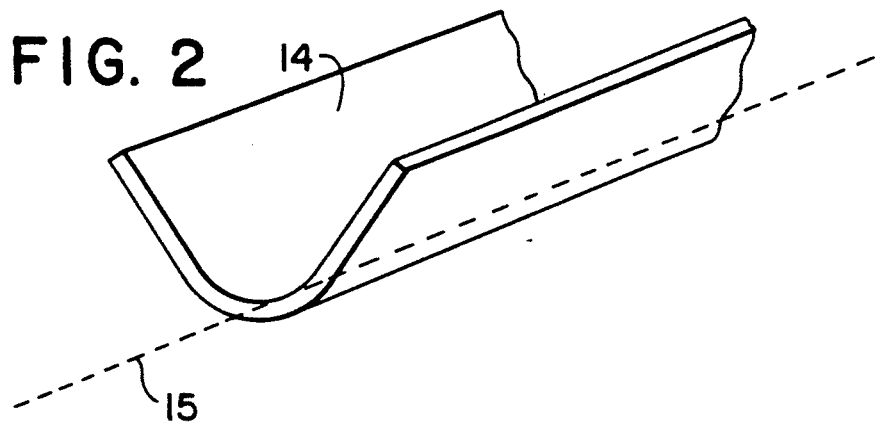
FIG. 2 shows how the laid up fibres of FIG. 1 are used to establish a basic elongate unit in accordance with the invention.

In production of the elongate member of FIG. 2, the arrays of fibres or filaments are set within a suitable material to create a rigid element having the geometry shown.

Figure 3:
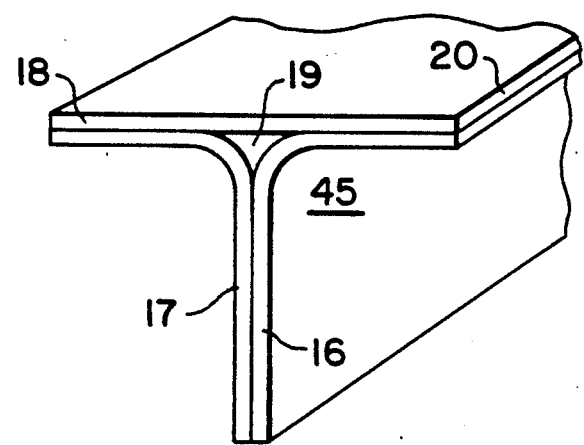
FIG. 3 shows an elongate member formed of an assembly of the units of FIG. 2.

In FIG. 3 is shown a composite elongate member 20 made from an assembly of two of the members of FIG. 2, 16 and 17, which form the leg of a T-shape element capped by a reinforced layer 18 which is preferably in accordance with FIG. 1 oriented with array 11 along the elongate length of the composite member. The hollow center 19 of the composite member may be filled with an impregnated material of compatible character to those materials which are chosen for the elements 16 to 18. It may be desirable that the pattern of filaments in the two curved elements be arranged to each be a mirror image of the other.

Figure 4:
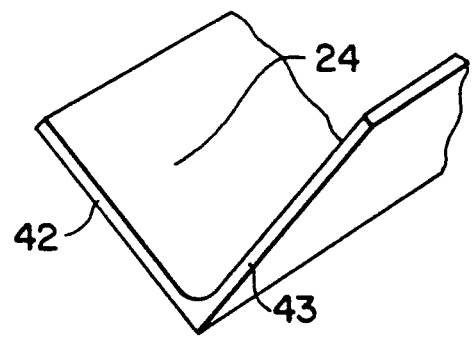
FIG. 4 shows an alternate elongate member formed from a unit of FIG. 2.

FIG. 4 shows an elongate member 24 which has a generally V-shape, with the angle of the arms 42 and 43 being set at 60° to provide the assembly as described below with reference to FIG. 6. The V at the apex may be produced by rolling over a mandrel, machining, etc.

Figure 5:
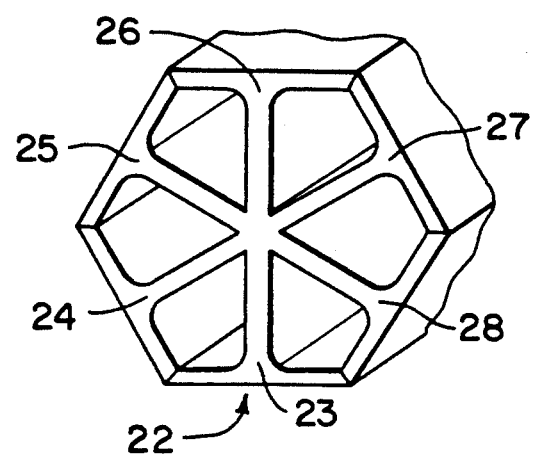
FIG. 5 shows an assembly of the elongate members of FIG. 5 in accordance with the invention.

FIG. 5 shows a rod 22 which is an assembly of six of the elements of FIG. 3, oriented as shown with the legs of the respective T-shaped members 23 to 28 extended to the center of the rod and the caps of the T-shapes mated to form a hexagon. This geometry is particularly suited to production of a fishing rod. In other applications, the number of elements might be varied to produce other polygonal assemblies.

In production of the assembly of FIG. 5, the edges of the caps of the T-shape members in accordance with FIG. 3 are machined at an appropriate angle to provide mating surfaces whereat bonding may be effected so as to produce the requisite polygonal structure. The legs of the T-shapes, if it is chosen extend them to the Center may be also machined at an angle to provide mating surfaces at which bonding may be effected.

Figure 6:
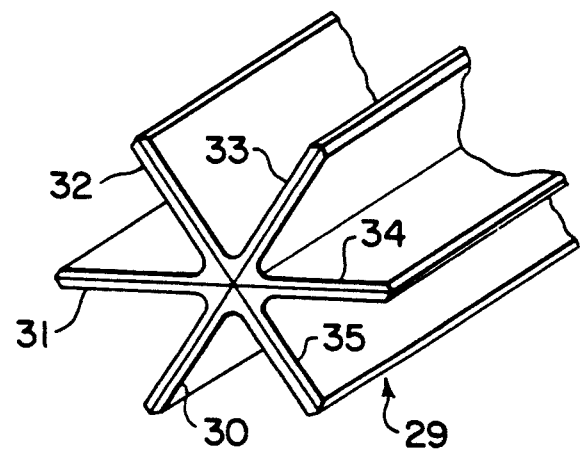
FIG. 6 shows an assembly of the elongate members of FIG. 4 in accordance with the invention.

FIG. 6 shows how the member of FIG. 4 may be assembled to produce a polygonal structure. The assembly 29 of FIG. 6 comprises six members 30 to 35 assembled with their arms butted and bonded together. In production of a polygonal assembly other than a hexagon, all that is required is that the member of FIG. 4 be produced with its arms 42 and 43 at a different angle appropriate to the chosen geometry. The assembly may have a winding thereabout to provide flat outer surfaces.

Figure 7:
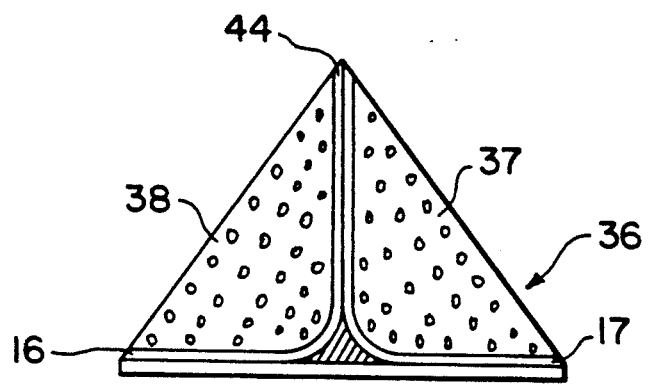
FIG. 7 shows a development of the elongate member of FIG. 3.
Figure 8:
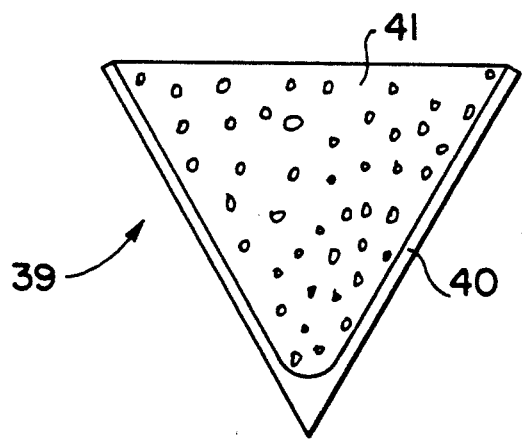
FIG. 8 shows a development of the elongate member of FIG. 4.

In production of the assemblies of FIGS. 5 and 6 a fair degree of free space exists, and FIGS. 7 and 8 show adaptations of the members of FIGS. 3 and 4 which utilise this free space to good purpose.

FIG. 7 shows a member 36 with infills 37 and 38 which converts the T-shape, to a wedge shape with the angle of the wedge determined by the number of elements to be assembled to create a chosen polygonal geometry. The infills 38 and 37 serve to encompass the leg 44. In bending the rod in a plane through the leg 44 to compress the leg, the tendency for the leg is to buckle. The pressure of the infills about the leg oppose this and add to the resiliency of the rod. The tendency to buckle may be resisted by an increased radius of curvature in the elements 16 and 17. In a rod which is loaded to one end, strength might be provided with a taper to larger dimensions, but if only the depth of the leg is increased, the tendency to buckle will be greater. This latter effect is compensated for by increasing the radius of curvature of the elements 16 and 17 as the dimensions increase.

In FIG. 8, the infill 41 in the open V of member 39 provides a flat outer surface such that in assembly of the members to produce the rod 29 of FIG. 6 there results a polygonal body with flat outer surfaces which are then convenient mounting surfaces for features such as the line guides of a fishing rod. A more solid outer surface may be established with a winding thereabout. The provision of the flat surface enables a line of guides to be mounted along the rod with the guides established in proper linear alignment without any of the difficulties or adjustments required in making rods from cylindrical rods.

It is possible to provide rods using the above techniques with a taper therealong. An element such as the member of FIG. 4 may be tapered by being placed apex down in the groove of a flat, which groove is machined with a progressive change in depth so that the member lies therein with a tapered length of material projected above the flat, which, if it be ground off down to the flat, leaves a length of member 24 in the groove which is tapered. Assembling the requisite number of these elements produces a tapered rod much as is usual in the production of tapered split cane rods. In the same way a member such as 36 of FIG. 7 may be machined over its length to reduce the area of its wedge to produce a taper.

In preparation of a rod in accordance with the above described production techniques, the physical properties of the rod may be selected by choice among various parameters. In preparation of the elements of the T section, for example, the radius 45 (see FIG. 3) is a critical factor. An increase in this radius produces rods with a slow action when their return from a bent configuration is considered. A decrease produces a crisper action which, in the case of fishing rods, provides the action desired in a fly fishing rod.

In preparation of the array of fibres or filaments, a choice of material, fibre diameter, number of fibres per layer, number of layers, in addition to the radius of curvature, affects the qualities of the rod. So to does the nature of the fillers, the bonding materials or techniques employed to unify the assembly. However, in construction of rods, the factors which are most significant to the character of the rod are its triaxial reinforcement patten and the radius of curvature worked into the pattern in production of the generally T and V shape sections used to construct the rod.

In production of fishing rods, the quality of the rod will be affected by the choice of T or V elements for the assembly. T-shape elements are more useful for game fishing rods whereas the V-shape may be more useful for a lighter type of fishing rod.

Rods produced by the above means make economical use of exotic fibres with a more crush proof construction. In flexing, the rods of the invention provide increased power with the sensitivity that a fisherman requires to be able to be retained. The invention enables production of a light rigid structure which when tapered enables the action of the rod to be moved to a region therealong to enable the rod to be tailored for specific purposes. A slow taper may move the action of the rod in flexing to a middle part whereas a fat taper will move the action to the tip.

In a preferred form of the invention the rod comprises a bonded carbon fibre structure whose elements are bonded together by a bonding agent such as a resin adhesive with high mechanical and dynamic strength. A prepreg material might be provided to fill out the hollow cure of the T-shape section. A foam material might fill out hollows of the assembly. A man skilled in the art will be aware of the range of materials that might be drawn upon in fabrication of a rod in accordance with the invention. The actual combination of materials will depend upon the use the rod is put to, the environment it must endure, and factors such as weight, cost, availability of materials, etc.

In preferred forms, carbon fibres may be bonded by epoxy resin. Polyurethane and polyvinylchloride foams may be used as fillers. Glass and carbon fibre windings may be wrapped about the outer surfaces and bonded with epoxy resins. Depending on uses and loadings, any of the vast range of fibres, bonding agents, fillers and windings may find use in performance of the invention.

I claim:

1. A rod comprising a plurality of elongate members each having abutment faces which permit elongate members to be contacted and joined together in an assembly wherein:

each elongate member has a generally T-shape cross-section and is formed from fibre reinforced sheet material, each member comprising two outwardly curved members each formed with first leg sections contiguously disposed and connected to form a web of the T-shape, and second leg sections extending at an angle to said first leg sections, and a planar cap member spanning and connected to said second leg sections to form the cap of the T-shape, said cap member having opposite ends which define abutment faces, each curved member having a curved radius portion between said leg sections, said curved radius portion and said planar cap defining a space therebetween which is filled with a filler material;

said first leg sections of said elongate members extending in a direction towards a common axis; and said cap members are joined together so that said abutment faces of adjacent cap members are contiguous, thereby forming said assembly.

2. A rod as claimed in claim 1 wherein the T-shaped elongate members are reduced in cross-section towards one end such that said assembly is tapered towards said end.

3. A rod as claimed in claim 1 wherein each elongate member has areas on either side of said web and below said cap, each said area being outwardly defined by a plane passing through the ends of said first and second leg sections, said areas being filled with a filler material that produces, in section, a wedge shaped member whose tapered faces can be butt joined to adjacent elongate members similarly formed.

4. A rod as claimed in claim 1, wherein each curved member has a longitudinal axis and comprises a composite body formed with at least one reinforcing extending therethrough in a predetermined pattern which in planar form comprises a first array of fibres or filaments extending parallel to the length of the curved member, a second array of fibres or filaments arrayed across said first array, and a third array of fibres or filaments arrayed oppositely to the second array and cutting across both the first and second arrays; and wherein the reinforcing layer is folded or curved about an axis which is parallel to said longitudinal axis and said first array.

5. A rod as claimed in claim 4, wherein the elongate members are reduced in cross-section towards one end and their assembly produces a rod that is tapered to that end.

* * * * *